United States Patent [19]

Madey

[11] Patent Number: 4,479,219
[45] Date of Patent: Oct. 23, 1984

[54] EXCITATION CANCELLING FREE ELECTRON LASER

[76] Inventor: John M. J. Madey, 2120 Amherst St., Palo Alto, Calif. 94306

[21] Appl. No.: 279,122

[22] Filed: Jun. 30, 1981

[51] Int. Cl.³ .............................................. H01S 3/00
[52] U.S. Cl. ....................................................... 372/2
[58] Field of Search ............................................. 372/2

[56] References Cited

U.S. PATENT DOCUMENTS 3,822,410   7/1974   Madey .................................... 372/2

OTHER PUBLICATIONS

"Reducing the Sensitivity of a Free-Electron Laser to Electron Energy", Smith et al., J. Appl. Phys., vol. 50, No. 7, 1979.
John M. J. Madey, Robert C. Taber, "Equations of Motion . . . with a Transverse Gradient", *Physics of Quantum Electronics*, vol. 7, 8/1980.
John M. J. Madey, "Cancellation of Transverse Excitation in Gain Expanded Free Electron Lasers", *HEPL Report* 850, 5/1979.
John M. J. Madey, Robert C. Taber, "Gain and Saturation in Excitation Cancelling . . . Lasers", *HEPL Report* 855, 9/1979.

*Primary Examiner*—William L. Sikes
*Assistant Examiner*—Léon Scott, Jr.
*Attorney, Agent, or Firm*—Townsend and Townsend

[57] ABSTRACT

A gain-expanded free electron laser in which a relativistic electron beam exchanges energy with an electromagnetic wave in an interaction region defined by a magnet system is configured to suppress betatron excitation. The magnet system, the electromagnetic wave, and electron beam are characterized by a net optical phase slip qL during the interaction between the phase of the electromagnetic wave and the phase of the electron transverse velocity, and a net betatron phase advance $\tilde{\Lambda}L$. The optical phase slip and the betatron phase advance are chosen to satisfy the following constraints $$|qL| = K\pi$$

$$|qL - \tilde{\Lambda}L| = M 2\pi$$

where K is an integer and M is a positive integer. These constraints suppress the excitation of the betatron motion that is excited during the pass of the electrons through the interaction region. The constraints are typically realized by first choosing the operating wavelength or electron energy to satisfy the constraint on q, and then choosing the dispersion constant or the magnetic field to generate a value of $\tilde{\Lambda}$ differing from qL by a multiple of $2\pi$.

14 Claims, 4 Drawing Figures

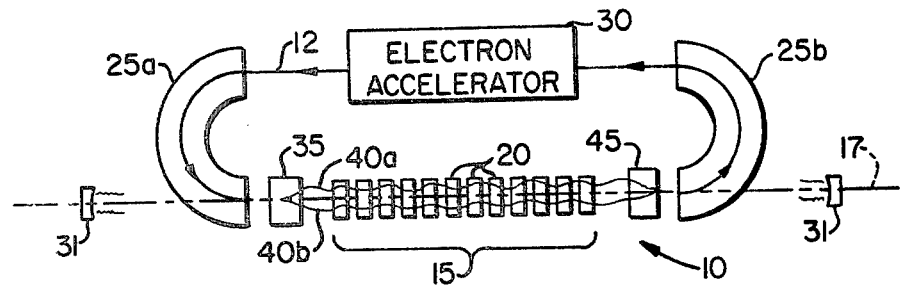
FIG._1. (PRIOR ART)
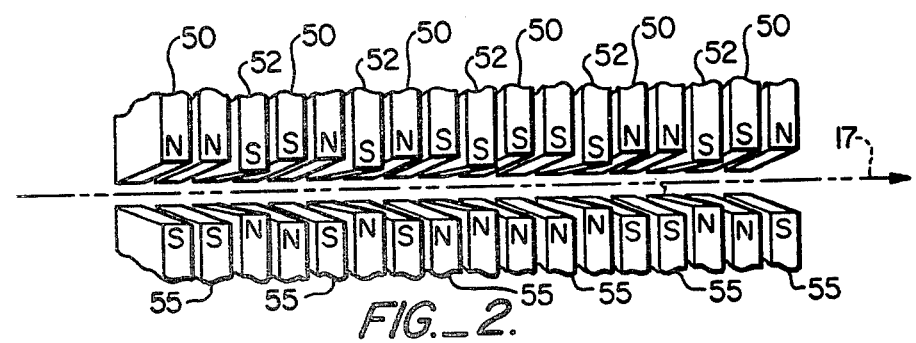
FIG._2.
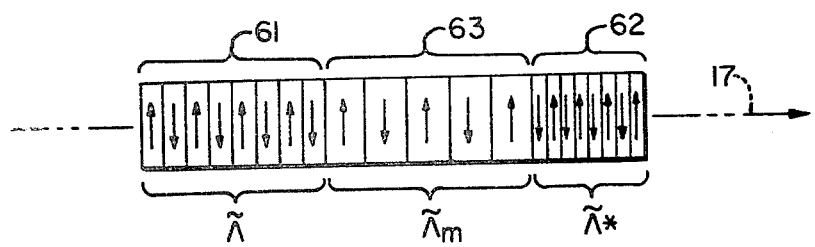
FIG._3.
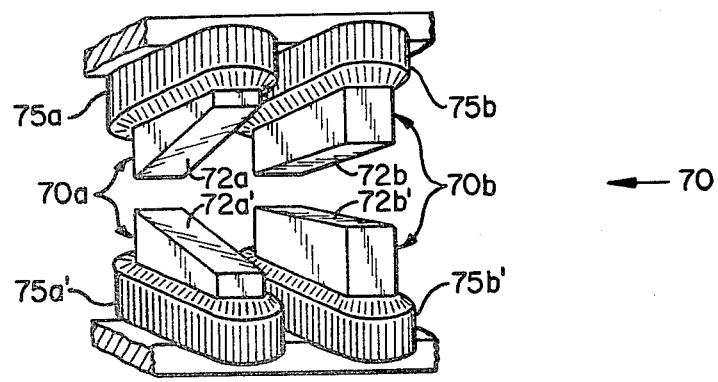
FIG._4.

EXCITATION CANCELLING FREE ELECTRON LASER

The Government has rights in this invention pursuant to Contract No. DASG60-77-C-0083 awarded by Ballistic Missile Defense System Command, Department of the Army.

FIELD OF THE INVENTION

The present invention relates to free electron lasers.

BACKGROUND OF THE INVENTION

Two desirable attributes of lasers operable in the visible and infrared are high output power and tunable output wavelength. These attributes are available individually-existing carbon dioxide lasers are capable of providing 10 kilowatts or more output at a fixed wavelength, and there exist tunable lasers capable of providing variable visible wavelengths at output powers ranging from milliwatts up to approximately 10 watts. However, there have not heretofore been any lasers capable of providing both of the sought after attributes in a single device.

The free electron laser as described in U.S. Pat. No. 3,822,410 issued July 2, 1974 to John M. J. Madey has shown considerable promise in making available a tunable high power device. In a free electron laser, a relativistic electron beam is caused to interact with an electromagnetic wave in the presence of a transverse, periodic magnetic field. Assuming a TEM electromagnetic wave, the operating wave length $\lambda$ is given by:

$$\lambda = \left(1 - \frac{v_{par}}{c}\right) \lambda_q \quad (1\text{-}1)$$

where
- $v_{par}$ ≡ electron longitudinal velocity, measured parallel to the direction of propagation of the electromagnetic wave
- c ≡ speed of light
- $\lambda_q$ ≡ magnet period, measured parallel to the direction of propagation of the electromagnetic wave.

This relationship follows from the requirement that the frequency of the electrons' spontaneous radiation match the frequency of the electromagnetic radiation to be amplified, or alternatively, that the electrons' transverse velocity remain synchronized with the optical electric field during the interaction. In systems involving wave propagation at velocities less than c, as in a wave guide or light pipe, c would be replaced by the phase velocity of the wave.

The electrons' longitudinal velocity is determined by their energy, the direction of their motion through the magnetic field, and the period and amplitude of the magnetic field. Thus, in a conventional free electron laser, the wavelength $\lambda$ is approximately given by:

$$\lambda = \frac{\lambda_q}{2\gamma_0^2} (1 + \alpha^2 B^2 + \gamma^2 \theta^2) \quad (1\text{-}2)$$

where
- $\gamma_0$ ≡ (electron energy)/$mc^2$
- $\alpha^2 B^2 \equiv (\lambda_q eB/\sqrt{2\pi} mc^2)^2$
- m ≡ electron rest mass (grams)
- e ≡ electron charge (statcoulombs)
- B ≡ rms amplitude of the periodic magnetic field
- $\theta$ ≡ average angle at which electrons move through the interaction region, measured relative to the direction of propagation of the electromagnetic field.

While the dependence of wavelength on electron energy permits the free electron laser to be tuned by varying the electron beam energy, the dependence of wavelength on energy also introduces problems, especially where the electron energy is poorly defined. More particularly, if the electron energy spread is large, the phase match condition of Equation (1-1) will be violated for some portion of the electron distribution, and the laser gain and power output will be reduced.

One approach to solving this problem is the subject of copending U.S. patent application Ser. No. 55,163 of Smith et al., filed July 6, 1979, and entitled "Free Electron Laser." The technique disclosed therein is known as gain expansion and seeks to preserve the phase match condition for electrons of differing energies by causing the higher energy electrons to move through the periodic magnet in a region of higher magnetic field or at a larger angle $\theta$. From Equations (1-1) and (1-2) it can be seen that the phase match condition ($v_{par}$ independent of energy) will be preserved so long as the electrons are dispersed in transverse position or angle such that the ratio $(1 + \alpha^2 B^2 + \gamma^2 \theta^2)^{\frac{1}{2}}/\gamma$ remains constant.

The deviation of the electrons' actual transverse coordinates from their nominal coordinates defines the "betatron amplitude" $x_\beta$ as follows:

$$x_\beta(z) = x(z) - x_0(z) \quad (1\text{-}3)$$

where
- z ≡ longitudinal coordinate
- $x_0(z)$ ≡ nominal transverse position of electron with energy $\gamma mc^2$
- x(z) ≡ actual transverse position of electron.

The magnitude of $x_\beta$ and its derivative $x_\beta'$ with respect to z is a measure of the loss of correlation of the energy and transverse coordinates. The betatron amplitude will evolve, along with the energy, as the electron beam moves through the laser magnet. While the betatron motion is to some extent damped by the synchrotron radiation, the damping rate is typically small. If, in a gain-expanded storage ring free electron laser, the growth of $x_\beta$ and $x_\beta'$ in a single passage through the laser exceeds the reduction of these quantities due to synchrotron damping, the betatron amplitude will grow from pass to pass through the laser, and the correlation of energy and transverse position will be lost.

Accordingly, there is presented the need for a free electron laser configuration wherein the growth of $x_\beta$ and $x_\beta'$ is limited, so that degradation of the power output and efficiency of gain-expanded storage ring free electron lasers is avoided.

SUMMARY OF THE INVENTION

The present invention provides a high gain tunable gain-expanded free electron laser wherein the optical phase slip, betatron phase advance, and periodic magnetic field amplitude and period are chosen to suppress the excitation of the betatron motion. In all cases it is assumed that the magnetic field (or a component thereof) has a transverse gradient which focuses the electrons about their nominal transverse positions in the periodic field.

In a first embodiment, characterized by a magnetic field having constant amplitude and period, the optical phase slip per unit length q and the betatron phase advance per unit length $\tilde{\Lambda}$ are chosen to satisfy the following constraints:

$$|qL| = K\pi \text{ (radians)}$$

$$|qL - \tilde{\Lambda}L| = M2\pi \text{ (radians)}$$

where K is integral and M is any integer greater than zero. Typically, these constraints are realized by first choosing the operating wavelength or electron energy to satisfy the constraint on q, and then choosing the dispersion constant $\eta$ or the magnetic field strength B(at x=0) to generate a value of $\tilde{\Lambda}L$ differing from qL by an integral multiple of $2\pi$.

In an alternate embodiment, the laser magnets are configured so that the periodic component $B_0$ of the magnetic field and the period $\lambda_q$ of the fundamental periodic component vary with longitudinal position in a manner characterized by a generating function. In this embodiment, $v_{par}$ is kept independent of longitudinal coordinate z by configuring the magnets to provide a supplementary periodic field component, preferably an even order harmonic or sub-harmonic of the fundamental component.

While the configuration of the magnets as summarized above is effective to limit the growth of the betatron motion, the small signal gain is reduced to zero unless further modifications are made. More particularly, the beta-tron phase advance per unit length $\tilde{\Lambda}$ is required to be a function of longitudinal coordinate z. This is accomplished by having the magnet period $\lambda_q$, the amplitude $B_0$, or the gradient k of the fundamental periodic field, or the period, amplitude, or gradient of the supplementary field vary with longitudinal coordinate. Preferably, the change in focusing is achieved through the variation of the period and amplitude of the supplementary periodic field.

According to a further aspect of the present invention, the laser system is provided with the capability of being tuned. While the use of a gain-expanded configuration eliminates the ability to vary the output wavelength by varying the electron energy, the present invention overcomes this limitation by providing a controllably variable magnetic field gradient. This may be implemented by use of split pole magnets where the poles are split into two separately excited segments producing differing transverse gradients.

For a further understanding of the nature and advantages of the present invention, reference should be made to the remaining portions of the specification and the attached drawings.

BRIEF DESCRIPTION OF THE DRAWINGS

FIG. 1 is a schematic plan view of a gain-expanded storage ring free electron laser system;

FIG. 2 illustrates the basic magnet configuration;

FIG. 3 is a schematic of a system incorporating a change in focusing; and

FIG. 4 illustrates a split-pole magnet for providing a variable gradient.

BASIC CONFIGURATION

FIG. 1 is a schematic view of a storage ring free electron laser system 10 utilizing the basic gain-expanded configuration disclosed in the above-mentioned copending U.S. patent application Ser. No. 55,163. The principles of operation and a more detailed description of the construction of laser system 10 are set forth in the above-mentioned U.S. Pat. No. 3,822,410 and copending U.S. patent application Ser. No. 55,163, both of which disclosures are hereby incorporated by reference.

A relativistic electron beam 12, having been generated by any convenient means such as a particle accelerator (not shown) is introduced into a laser section 15 along an axis 17 which defines the optical axis of the system. The electrons in beam 12 have a mean energy $\gamma mc^2$ where m is the electron mass, c is the speed of light, and $\gamma = 1/\sqrt{1-(v/c)^2}$. Laser section 15 comprises a plurality of magnets 20 configured to produce a spatially alternating magnetic field so that beam 12 is caused to undergo undulating transverse motion. Magnets 20 are shown in barest schematic form, with the particular configurations for the various embodiments being shown in other figures to be described below. Beam 12 is circulated in a storage ring having an injection section 25a and an extraction section 25b so that the beam may make multiple passes through laser section 15. Between extraction and injection, beam 12 is passed through an RF accelerating cavity 30 which restores to the beam the energy lost in laser section 15. Laser system 10 may be operated as an amplifier or an oscillator. Laser mirrors 31 are shown as defining a resonant optical cavity for oscillation.

Electrons circulating through the storage ring follow trajectories which are, in general, displaced in transverse position from the nominal orbit in proportion to their deviation in energy from the nominal energy. Immediately prior to entry into laser section 15, beam 12 is passed through a matching section 35 designed to focus the beam at the entrance of laser section 15 and adjust the electrons' transverse positions to match the intrinsic dispersion of the laser section. The relation of the electrons' transverse coordinates and energy is indicated symbolically by two separate trajectories 40a and 40b of two electrons having respective energies $e_1$ and $e_2$. After the dispersed electrons have traversed laser section 15, they are passed through a second matching section 45 which shifts the electrons' transverse positions to match the dispersion function of the ring.

In the basic gain-expanded configuration, the magnetic field provided by magnets 20 is characterized by a transverse gradient in order that the electrons which are spatially classified according to energy move through regions of different magnetic field or at differing angles relative to axis 17. In the discussion that follows, the electrons will be assumed to move along the z axis, and the magnetic field will be assumed to be parallel to the y-axis axis. In principle, many possible field configurations can be employed to produce the dispersion, focusing, and equalization of longitudinal velocities required for this invention. As an example, the transverse gradient can be introduced either separately or as part of the periodic laser magnet. The function of the invention is unaffected by the field configuration so long as the field leads to the appropriate equations of motion for the electron energy, transverse position, and optical phase.

For the purposes of analysis, it is convenient to assume that the gradient is incorporated within the periodic field, leading to a field of the form:

$$B = \sqrt{2}\, B_0(z)(1 + kx)\cos\left(\int_{-L/2}^{z} \frac{2\pi dz'}{\lambda_q}\right) \quad (2\text{-}1)$$

$$+ \sqrt{2}\, B_n(z)(1 + kx)\cos\left(\int_{-L/2}^{z} \frac{2\pi dz'}{\lambda_n}\right)$$

$$+ B_c(1 + sx)$$

where  $B_0 \equiv$ rms amplitude of the fundamental periodic field component at $x = 0$ (gauss)

$k \equiv$ transverse gradient of the fundamental periodic field component (cm$^{-1}$)

$B_n \equiv$ rms amplitude of the supplementary field component at $x = 0$ (gauss)

$\lambda_n \equiv$ period of the supplementary periodic field component (cm)

$B_c \equiv$ amplitude of the constant field component at $x = 0$ (gauss)

$s \equiv$ transverse gradient of the constant field component (cm$^{-1}$)
 $= k/(1 + \alpha^2 B^2)$ $$\alpha^2 B^2 \equiv \left(\frac{e}{mc^2}\right)^2 \left[\left(\frac{\lambda_q B_0}{2\pi}\right)^2 + \left(\frac{\lambda_n B_n}{2\pi}\right)^2\right]$$

$L \equiv$ interaction length ($-L/2 \leq z \leq +L/2$)

This configuration of magnetic field is consistent with a linear dependence of electron energy on transverse position. More particularly, the nominal electron energy $\gamma(x)$ as a function of mean transverse coordinate x within the laser section is given by:

where  $(2\text{-}2)$ $$\gamma(x) = \gamma_0\left(1 + \frac{x}{\eta}\right)$$

$\gamma_0 \equiv$ (nominal electron energy at $x = 0$)/$mc^2$ $\eta \equiv$ intrinsic dispersion constant of the laser section $$\approx \left(\frac{1}{k-s}\right) = \frac{1 + \alpha^2 B^2}{\alpha^2 B^2}\left(\frac{1}{k}\right)$$

It should be noted that Equation (2-2) refers to the mean transverse position x, where the average is to be taken over the magnet period. The periodic reversals of magnetic field will result in microscopic periodic motion about the mean position.

A schematic representation of the magnet system for producing such a magnetic field is shown in FIG. 2. The magnet system includes three interleaved pluralities of magnets, the magnets in each plurality being designated 50, 52, and 55, respectively. Magnets 50 alternate in polarity to define the periodic field having rms amplitude $B_0$ and period $\lambda_q$. Magnets 52 have their poles aligned to define the constant field component. Magnets 55 alternate in polarity at a frequency that is one-half the frequency defined by magnets 52, and provide the supplementary field component $B_n$. Other even harmonics or subharmonics are also suitable. Each of magnets 50, 52, and 55 has tapered pole faces so that the magnetic field varies linearly with transverse coordinate. Generally, magnets 50 will have a particular angle of taper while magnets 52 will have a different angle to provide a different transverse gradient. The amplitudes of the periodic and constant components are defined and controlled by the currents supplied to the field windings of the magnets or, if permanent magnets are employed, by the magnetization of the poles.

EQUATIONS OF MOTION

The above magnet configuration satisfies the conditions required for the operation of a gain-expanded free electron laser, but does not specifically define the excitation cancelling system of the present invention. Understanding of the suppression of excitation of the betatron motion is best achieved by reference to the equations of motion and the effects of the coefficients in these equations on the electron transverse coordinates $x(z)$ and $dx/dz$, the electron fractional deviation from nominal energy $\delta$, and the phase angle $\psi$ between the electric field and the electron transverse velocity.

In the first embodiment of the invention, it is assumed that the magnet period $\lambda_q$ and amplitude $B_0$ are constants. For simplicity it will be also assumed that the supplementary component $B_n$ is zero. Assuming the magnetic field and dispersion indicated in Equations (2-1) and (2-2), the averaged electron coordinates x, $\delta$, and $\psi$ evolve during the interaction (that is, have z dependence) as follows:

$$\frac{d^2 x}{dz^2} = -\eta \tilde{\Lambda}^2 \left[\frac{x}{\eta} - \delta(1 + sx)\right](1 - 2\delta) - 2\frac{dx}{dz}\frac{d\delta}{dz} \quad (3\text{-}1)$$

$$\frac{d\delta}{dz} = \frac{e|\epsilon|}{2\gamma_0 mc^2}\left(\frac{\lambda_q}{2\pi\rho_0}\right)[J_{(N-1)/2}(N\xi) - J_{(N+1)/2}(N\xi)] \cdot \quad (3\text{-}2)$$

$$(1 + kx)(1 - \delta)\sin\psi$$

$$\frac{d\psi}{dz} = q + \left(N\frac{4\pi}{\lambda_q} + q\right)\left[\delta - (1 + \delta)\frac{x}{\eta}\right] - \quad (3\text{-}3)$$

$$\left(\frac{\omega}{2c}\right)\left(\frac{dx}{dz}\right)^2$$

where  $J_{(N-1)/2}, J_{(N+1)/2} \equiv$ cylindrical Bessel functions of order $(N-1)/2, (N+1)/2$ $\delta = (\gamma - \gamma_0)/\gamma_0$
$\omega \equiv$ optical frequency of the laser $= 2\pi c/\lambda$
$\omega_0 \equiv$ fundamental optical frequency $= 2\pi c/[\lambda_q(1 - v_{par}/c)]$
$N \equiv$ harmonic number for the optical field $= \omega/\omega_0$
$\epsilon \equiv$ amplitude of the optical electric field (statvolts/cm)

$\rho_0 \equiv$ characteristics gyro radius $= \gamma_0 mc^2/(\sqrt{2}\, eB_0)$ $$\xi = \frac{\omega_0 e^2}{4m^2 c^5}\left(\frac{\lambda_q}{2\pi}\right)^3 \left(\frac{B(x)}{\gamma}\right)^2$$

$\tilde{\Lambda} \equiv$ betatron phase advance per unit length $$\cong (1 + \alpha^2 B^2)^{\frac{1}{2}}/\left[1 - \left(\frac{dX}{dx}\right)^2\right]^{\frac{1}{2}} \eta \gamma_0$$

$X \equiv$ amplitude of electron transverse motion at $x = \eta\delta$

-continued $q$ = optical phase slip per unit length =

$$(2\pi N/\lambda_q) - (\omega/c)(1 - v_{par}/c)$$

$$B_c = \frac{kB_0}{\sqrt{2}}\left(\frac{\lambda_q}{2}\right)^2\left(\frac{1}{\rho_0}\right)$$

e, m, c, $\gamma_0$, $\lambda_q$, $\eta$, $v_{par}$ have already been defined. These equations are derived from the Lorentz Force equation neglecting terms of order $(\lambda_q B_c)/(\rho_0 B)$ and $(k\lambda_q/\rho_0)^2$ and assuming $\delta<<1$ and $x/\eta<<1$. Although the non-linear terms proportional to $x^2$, $\delta^2$, and $x\delta$ depend on the assumed form of the magnetic field, these terms are small, and are not a factor in the operation of the present invention. A fuller discussion of these equations may be found in Volume 7 of the textbook entitled "Physics of Quantum Electronics" (M. Sargent, M. Sculley, H. Pilloff, and R. Spitzer, editors), published 1980 by Addison-Wesley.

Starting from the initial conditions at the start of the interaction, the equations of motion can be integrated to determine the electron coordinates at the end of the interaction. When this is done, either explicitly or formally, the betatron amplitude at the end of the interaction can be seen to depend on the relative magnitudes of q and $\tilde{\Lambda}$, or in an alternate embodiment to be described below, on the magnitude and functional form of $\tilde{\Lambda}$, B, and $\lambda_q$. The betatron amplitude can be minimized by optimizing these quantities.

The significant features of the solutions to Equations (3-1), (3-2), and (3-3) can be demonstrated in a linear approximation where $\gamma$ and x are evaluated to first order in the optical electric field $\epsilon$. Assuming on-axis initial motion, that is, $x_\beta = x_\beta' = 0$, the first order betatron coordinates at the ends of the interaction region assume the following form:

$$x_\beta = \eta\frac{e|\epsilon|}{\gamma_0 mc^2}\left(\frac{\lambda_q}{2\pi\rho_0}\right)[J_{(N-1)/2} - J_{(N+1)/2}]\frac{1}{q^2 - \tilde{\Lambda}^2} \cdot \quad (3\text{-}4)$$

$$[q\cos(\tilde{\Lambda}L + \psi_0) - (q - \tilde{\Lambda})\sin\psi_0\sin\tilde{\Lambda}L - q\cos(qL + \psi_0)]$$

$$x_\beta' = \eta\frac{e|\epsilon|}{\gamma_0 mc^2}\left(\frac{\lambda_q}{2\pi\rho_0}\right)[J_{(N-1)/2} - J_{(N+1)/2}]\frac{\tilde{\Lambda}}{q^2 - \tilde{\Lambda}^2} \cdot \quad (3\text{-}5)$$

$$[q\sin(\tilde{\Lambda}L + \psi_0) - (q - \tilde{\Lambda})\sin\psi_0\cos\tilde{\Lambda}L - q\sin(qL + \psi_0) +$$

$$(q - \tilde{\Lambda})\sin(qL + \psi_0)]$$

where $\psi_0 \equiv$ initial value of $\psi$

It can be seen from Equations (3-4) and (3-5) that the cancellation of betatron excitation can be achieved if the net optical phase slip qL and the betatron phase advance $\tilde{\Lambda}L$ are chosen to satisfy the following conditions:

$$|qL| = K\pi \quad (3\text{-}6)$$

$$|qL - \tilde{\Lambda}L| = M2\pi \quad (3\text{-}7)$$

where K is an integer and M is a positive integer. The constraints of Equations (3-6) and (3-7) are incorporated into the magnetic field structure by first choosing the operating wavelength and/or electron energy and magnetic field strength to satisfy the constraint on q, and then choosing the dispersion constant $\eta$ to generate a value of $\tilde{\Lambda}L$ differing from qL by an integral multiple of $2\pi$.

The addition of the supplementary field $B_n$ alters the energy and phase evolution equations as shown in Equations (3-8) and (3-9) below. However, the supplementary field does not itself change the dependence of $x_\beta$ and $x_\beta'$ on $\tilde{\Lambda}$ and q. It follows that the conditions of Equations (3-6) and (3-7) on $\tilde{\Lambda}$ and q will remain effective even when the field is altered by the addition of the supplementary component.

Given the approximations incorporated in Equations (3-4) and (3-5), the constraints on q and $\tilde{\Lambda}$ are generally not sufficient to cancel the betatron excitation for off-axis initial motion or when the non-linear and higher terms are included. However, the growth introduced by the neglected terms is small, and generally less troublesome than the first order excitation.

The imposition of the constraints of Equations (3-6) and (3-7) on $\tilde{\Lambda}$ and q constitutes the first embodiment of the invention.

In the second embodiment of the invention the magnet period and field strength are made to vary along the length of the laser section.

The equations of motion (Equations (3-1)–(3-3)) incorporate the assumption that the amplitude and period of the magnetic field are fixed. If the magnetic field amplitude and period vary with longitudinal coordinate, the energy and phase evolution equations are altered. Equations (3-2) and (3-3) of the equations of motion are replaced by:

$$\frac{d\delta}{dz} = \frac{e|\epsilon|}{\gamma_0 mc^2}\left(\frac{\lambda_q}{4\pi\rho}\right)\sin\psi\,(1 + kx)\,J(\lambda_q, \rho, n, N, x) \quad (3\text{-}8)$$

$$\frac{d\psi}{dz} = q + N\left(\frac{2\pi}{\lambda_q} - \frac{2\pi}{\lambda_0}\right) + \left[N\left(\frac{4\pi}{\lambda_0}\right) + q\right] \cdot \quad (3\text{-}9)$$

$$\left[\delta - (1 + \delta)\frac{x}{\eta}\right] - \frac{\omega}{2c}\left(\frac{dx}{dz}\right)^2$$

where $\lambda_q$ = magnet period, as a function of $z$
$\lambda_0$ = nominal magnet period
$q$ = nominal phase slip per unit length
$n$ = harmonic number of the supplementary periodic field (see below) = $(\lambda_q/\lambda_n)$
$\rho$ = characteristics gyro radius for fundamental field component $\frac{\gamma_0 mc^2}{e\sqrt{2}\,B_0}$ $$J(\lambda_q, \rho, n, N, x) \equiv \left[\Sigma 1 - \Sigma 2 + \left(\frac{\lambda_n}{\lambda_q}\right)\left(\frac{\rho}{\rho_n}\right)(\Sigma 3 - \Sigma 4)\right]$$

$$\Sigma 1 = \sum_l \sum_m \sum_o \sum_p (-1)^o J_l J_m J_o J_p$$

$$2l + o + p + n(2m - o + p) = (N - 1)$$

$$\Sigma 2 = \sum_l \sum_m \sum_o \sum_p (-1)^o J_l J_m J_o J_p$$

$$2l + o + p + n(2m - o + p) = (N + 1)$$

$$\Sigma 3 = \sum_l \sum_m \sum_o \sum_p (-1)^o J_l J_m J_o J_p$$

$$2l + o + p + n(2m - o + p) = (N - n)$$

$$\Sigma 4 = \sum_l \sum_m \sum_o \sum_p (-1)^o J_l J_m J_o J_p$$

-continued $$2l + o + p + n(2m - o + p) = (N + n)$$

$$J_l \equiv J_l\left[\left(\frac{\omega}{c}\right)\left(\frac{1}{\rho}\right)^2\left(\frac{\lambda_q}{4\pi}\right)^3(1 + kx)^2\right]$$

$$J_m \equiv J_m\left[\left(\frac{\omega}{c}\right)\left(\frac{1}{\rho_n}\right)^2\left(\frac{\lambda_n}{4\pi}\right)^3(1 + kx)^2\right]$$

$$J_o \equiv J_o\left[\left(\frac{\omega}{c}\right)\left(\frac{\lambda_q}{4\pi\rho}\right)\left(\frac{\lambda_n}{4\pi\rho_n}\right)\frac{(1 + kx)^2}{(2\pi/\lambda_q) - (2\pi/\lambda_n)}\right]$$

$$J_p \equiv J_p\left[\left(\frac{\omega}{c}\right)\left(\frac{\lambda_q}{4\pi\rho}\right)\left(\frac{\lambda_n}{4\pi\rho_n}\right)\frac{(1 + kx)^2}{(2\pi/\lambda_q) + (2\pi/\lambda_n)}\right]$$

$\rho_n \equiv$ gyro radius in peak field of supplementary component $\dfrac{\gamma_0 mc^2}{e\sqrt{2}\, B_n}$ The coefficient $(1+kx) J (\lambda_q, \rho, n, N, x)$ in the energy evolution equation is determined by the amplitude of the magnetic field, while the difference $(2\pi/\lambda_q)-(2\pi/\lambda_0)$ in the phase evolution equation reflects the variation in the period of the magnetic field.

It is assumed in Equations (3-8) and (3-9), and in this embodiment of the invention, that the electron longitudinal velocity remains constant, even when the period and amplitude of the fundamental field component are altered. To secure this result, it is necessary to add the supplementary component $B_n$ to the magnetic field. The longitudinal veloctiy $v_{par}$ can be kept constant if $\lambda_n$ and $B_n$ are chosen to satisfy the condition:

$$\left(\frac{e}{2\pi mc^2}\right)^2 \{[\lambda_q(z)B_0(z)]^2 + [\lambda_n(z)B_n(z)]^2\} = \alpha^2 B^2 \quad (3\text{-}10)$$

where $\alpha^2 B^2 \equiv$ nominal value of coefficient in Equation (1-2) The period of the supplementary component should be an even harmonic or subharmonic of the fundamental component in order to minimize the effect of the supplementary field on the Fourier component of the transverse velocity which couples to the optical wave. Magnets 55 provide this supplementary periodic component. It is noted that within this choice in Equation (3-10) of $\lambda_n$ and $B_n$, the focusing strength $\tilde{\Lambda}$ remains as defined in Equations (3-1), (3-2) and (3-3).

It can be shown from the equations of motion, that is, Equations (3-1), (3-8), and (3-9), that the first order betatron amplitude can be reduced to zero in the linearized equations of motion if the amplitude and period of the fundamental and supplementary components of the magnetic field are selected to satisfy the following equation:

$$\frac{e}{\gamma_0 mc^2}\left(\frac{\lambda_q}{2\pi\rho_0}\right) J(\lambda_q, \rho_o, n, N, x = 0) = \frac{1}{n\tilde{\Lambda}^2} |G(z)| \quad (3\text{-}11)$$

$$N\left(\frac{2\pi}{\lambda_q} - \frac{2\pi}{\lambda_0}\right) = \frac{d}{dz} \text{argument}\, [G(z)] \quad (3\text{-}12)$$

where $G(z)$ is a complex complex function defined as follows:

$$G(z) = e^{iqz}\frac{d^2}{dz^2}\left[\left(z^2 - \frac{L^2}{4}\right)^2 f(z)e^{iqz}\right] + \quad (3\text{-}13)$$

$$\tilde{\Lambda}^2\left(z^2 - \frac{L^2}{4}\right)^2 f(z)$$

where $f(z)$ is any complex function having a continuous first derivative with respect to z for $-L/2 \leq z \leq +L/2$. It is noted that the left side of Equation (3-11), due to the presence of $\rho_0$ in the denominator, is approximately proportional to $B_0$. Given the generality of Equation (3-13), it is apparent that a large number of magnet geometries are possible, depending on the choice of $f(z)$.

In both the first and second embodiments of the invention, further control of the betatron excitation may be secured by exploiting the coupling of the electrons' transverse motion to their motion in energy and phase. Viewed in a general sense, the laser interaction transforms the electrons distribution in the four-dimensional phase space defined by $x_\beta$, $x_\beta'$, $\delta$, and $\psi$. A distribution which is initially confined to the $x_\beta - x_\beta'$ plane is rotated out of the plane by the laser interaction. Although such a rotational transformation does not alter the total volume of phase space occupied by the electrons, it renders possible the conversion of some fraction of the electron beam's transverse dimensions to an energy or phase spread during the interaction in laser section 15, and hence, the net reduction of the transverse dimensions. Since the gain-expanded system configuration is relatively tolerant of energy and phase spread, while requiring compact transverse dimension to maintain $(1+\alpha^2 B^2 + \gamma^2\theta^2)^{\frac{1}{2}}/\gamma$ constant, such a rearrangement of the electron distribution significantly improves the stability of the system. The degree of rotation is correlated with the net betatron phase advance and the optical power density, and at large betatron phase advance is sufficient to reduce the amplitude of the betatron motion to a value below the natural emittance. The effect is enhanced by maximizing the net betatron phase advance $\tilde{\Lambda}L$.

SMALL SIGNAL GAIN

While the magnetic field of either of the two embodiments described above provides the highly desirable property that the growth of the betatron motion is limited, there is also a reduction of the small signal (first order) gain. In fact, the small signal gain is reduced to zero unless the focusing strength $\Lambda$ is made to vary with longitudinal coordinate z.

Referring to the schematic view of FIG. 3, the change of focusing may be incorporated into the first embodiment of the invention by splitting the magnet into first and second parts, designated 61 and 62, with differing focusing strengths, and using a third gain-expanded part 63 to match the betatron amplitude and phase, and optical phase slip. Small signal gain is obtained if the length, period, strength, and gradient of the second part 62 of the magnet are appropriately adjusted and the betatron phase and optical phase slip advance by an integral number of periods in the third part 63 of the magnet.

This modification can be most easily understood in terms of the scaling relations for the solutions $x(z)$, $\delta(z)$, and $\psi(z)$ to the equations of motion. Assuming the focusing changes from $\tilde{\Lambda}$ in the first part of the magnet to $\tilde{\Lambda}^*$ in the second part, the solutions $x^*$, $\delta^*$ and $\psi^*$ in the second part scale according to:

$$x_\beta^*(z) \approx x^*(z) - \eta \delta^*(z)$$
$$= \nu^{\frac{1}{2}} x_\beta(z/\nu)$$
$$\delta^*(z) = \delta(0) + \nu^{\frac{1}{2}} [\delta(z/\nu) - \delta(0)]$$
$$\psi^*(z) = \psi(z/\nu)$$

where $\nu \equiv (\tilde{\Lambda}/\tilde{\Lambda}^*)$ and it is assumed that $z=0$ defines the plane at which the basic constant-focusing magnet is split, and the beginning of the second part of the magnet in the split-magnet derivative.

To secure the scaled solutions, the configuration of the magnetic field in the scaled second part of the magnet must be scaled to provide a period $\lambda_q^*$, harmonic number $N^*$, optical phase slip $q^*$, and interaction strength $(e\epsilon/2\gamma_0 mc^2)/(\lambda_q^*/2\pi\rho_0^*)J^*$ satisfying the relations:

$$q^* = q/\nu$$

$$\left(N^*\left(\frac{4\pi}{\lambda_q^*}\right) + q^*\right) = \left(N\left(\frac{4\pi}{\lambda_q}\right) + q\right)/\nu^{3/2}$$

$$\frac{e\epsilon}{2\gamma_0 mc^2}\left(\frac{\lambda_q^*}{2\pi\rho_0^*}\right) J^* = \frac{e\epsilon}{2\gamma_0 mc^2}\left(\frac{\lambda_q}{2\pi\rho_0}\right) J/\nu^{\frac{1}{2}}$$

The conditions on magnet period and interaction strength of the two parts of the magnet will require the use of the supplementary field component to alter the longitudinal velocity and the interaction strength. The matching section 63 between the two parts 61 and 62 of the split magnet is required to transform the betatron amplitude $x_\beta$ and slope $x_\beta'$ to provide the appropriate initial conditions at the start of the second magnet, and to provide an integral $2\pi$ optical phase slip independent of the electron energy in transverse position. The latter condition requires that the matching section itself incorporate the magnetic field configuration defined in Equation (2-1), or its equivalent, to maintain constant longitudinal electron velocity. The condition on the betatron coordinates at the start of the second part of the laser magnet constrains the magnitude and variation of the betatron phase advance per unit length $\tilde{\Lambda}_m$ in the matching section. Specifically, $\tilde{\Lambda}_m$ must be set equal to $\tilde{\Lambda}$ at the start of the matching section, changing to $\Lambda^*$ at the end of the section. Also, the integral of $\Lambda_m$ over the length of the matching section must be set equal to $2\pi$ radians, $\int \tilde{\Lambda}_m dz = 2\pi$.

It is also necessary to choose the magnetic field configuration in the matching section to minimize the change in electron energy in this section. As in the earlier discussion of the supplementary field $B_n$, this can be accomplished by choosing the magnet period to minimize the amplitude of the Fourier component of the electrons' transverse velocity at the frequency of the optical field.

In the small signal limit, the average change in electron energy at the end of the second part of the magnet is $(1-\nu^{\frac{1}{2}})<\delta(0)>$. Gain is maximized by splitting the magnet at the plane at which the average energy loss $<\delta(0)>$ is greatest and employing the largest possible focusing ratio $\tilde{\Lambda}^*/\tilde{\Lambda}$. The excitation cancelling properties of the system are retained since $x_\beta$ and $x_\beta'$ are still forced to zero at the end of the interaction.

It is noted that the assumption that the magnet is split at the midpoint ($z=0$) was adopted to simplify the form of the expressions for $\chi_\beta$, $\delta$, and $\psi$ in the second part 62 of the laser. In principle, the magnet can be split at any point $z_0$, yielding a net change in energy during the interaction equal to $(1-\nu^{\frac{1}{2}})<\delta(z_0)>$ without excitation of $\chi_\beta'$. The conditions on the optical phase slip, magnet period, interaction strength, and matching section are unaffected by the position at which the magnet is split.

It should also be noted that a plurality of such two-section lasers can be cascaded to provide additional gain, or to modify the frequency dependence of the gain, without introducing betatron excitation.

In the second embodiment of the invention, the change in the focusing must also be accompanied by a change in the magnet period and amplitude. Specifically, a change in focusing modifies the generating function $G(z)$ by the addition of the following term $g(z)$:

$$G(z) \to G(z) + g(z) \tag{3-14}$$

$$g(z) = \tilde{\Lambda}^2 \frac{d}{dz}\left(\frac{1}{\tilde{\Lambda}^2}\right)\left(z^2 - \frac{L^2}{4}\right)\left[4zf(z) + \left(z^2 - \frac{L^2}{4}\right)(f'(z) + iq)\right]$$

The corrected amplitude and period of the field are computed from the revised generating function using Equations (3-11) and (3-12). As in the first embodiment, the improvement in gain is determined by the manner and rate at which the focusing strength is changed. As an example, Table I illustrates the computed average energy $<\delta\gamma>$ radiated by the electrons for a given value of $\alpha^2 B^2$ and optical power density for configurations with differing rates of change of focusing. For each system in Table I, the focusing varies with longitudinal position as follows:

$$\tilde{\Lambda}^2(z) = \tilde{\Lambda}_0^2\left(1 + \frac{2Vz}{L}\right)$$

Four systems having different values of V are considered.

TABLE I

| V | $<\delta\gamma>$ |
|---|---|
| 0.05 | $-1.61 \times 10^{-6}$ |
| 0.10 | $-3.34 \times 10^{-6}$ |
| 0.20 | $-7.04 \times 10^{-6}$ |
| 0.40 | $-1.54 \times 10^{-5}$ |

As can be seen from Table I the radiated energy (which is proportional to the gain) increases as the change in focusing during the interaction is made larger. However, for these systems, the gain increases approximately as the change of the square of $\tilde{\Lambda}$ as compared to the change of the square root of $\tilde{\Lambda}$ for the first embodiment of the invention.

The physical means available to change the focusing are restricted by the other conditions which must be satisfied by the magnetic field in the laser section. From Equations (3-1), (3-2), and (3-3), the focusing strength $\Lambda$ is determined by the nominal electron energy $\gamma_0$, the dispersion $\eta$, $\alpha^2 B^2$, and $dX/dx$. The energy $\gamma_0$ is evidently fixed while the value of $\alpha^2 B^2$ within the interaction region is restricted by the previously defined constraints on $\lambda_q$ and $J/\rho$. The only means remaining to change the focusing is the derivative $dX/dx$.

For a given $\alpha^2 B^2$, the amplitude of the transverse motion induced by a periodic field is proportional to the period. While the period of the fundamental component of the field is fixed, the period $\lambda_n$ of the supplementary component of the field can be changed at will. A change in the supplementary component will vary the value of X and hence the derivative $dX/dx$. In the preferred embodiment of the invention, the focusing is altered by changing the period $\lambda_n$ of the supplementary component of the field from one harmonic (or subharmonic) to another. In portions of the laser sections in which $\alpha^2 B^2$ is not constrained, such as the matching section of the split magnet of the first embodiment of the invention, the focusing can be most easily changed by varying $\alpha^2 B^2$. Also, X can be changed by altering the period $\lambda_q$ of the fundamental component of the field and operating the system on an odd harmonic (N=3, 5, 7, ...).

VARIATION OF WAVELENGTH

One of the highly desirable features of the basic free electron laser is its tunable characteristics. As can be seen in Equation (1-2), the operating wavelength can be changed by either changing the magnetic field strength or the energy of the incoming electrons. However, since a gain-expanded magnet structure is designed specifically to maintain the phase match condition at the operating wavelength as the electron energy is changed, it is no longer possible to tune the wavelength by changing only the electron energy. Rather, if it is desired to operate a gain expanded free electron laser at a given wavelength, the following three conditions must be met:

(1) The nominal operating energy $\gamma_0 mc^2$ and/or magnetic field strength must be changed to yield the required optical phase slip per unit length as defined in the equations of motion.

(2) The constant component $B_c$ of the magnetic field must be altered to permit electrons with the nominal operating energy to propagate through the magnet at x=0. Thus, if the magnetic field is generated by electromagnets, the power supplies for the field windings for constant field magnets 52 must be adjustable as required over the range of operating wavelength of the laser.

(3) The magnet gradients k and s in each pole of laser section 15 must be changed in proportion to $\gamma_0/(1+\alpha^2 B^2)^{\frac{1}{2}}$ to preserve the value of $\Lambda$ required to limit the growth of the betatron amplitude. Thus, magnets 50, 52, and 55 must be constructed so that their transverse gradient can be adjusted. FIG. 3 is a schematic representation of a split pole magnet 70, which could be used to provide the periodic or constant component. Magnet 70 includes first and second adjacent segments 70a and 70b which, while having the same polarity, are characterized by different angles of taper. Segment 70a includes tapered pole faces 72a and 72a' with associated windings 75a and 75a'. Segment 70b includes tapered pole faces 72b and 72b' with associated windings 75b and 75b'. Thus, adjustment of the relative excitation of the windings of magnet segments 70a and 70b permits the gradient to be varied between the limits obtainable by operation of either one individually. Alternately, a variation in gradient can be achieved by providing for mechanical adjustment of the opening angle of the pole faces.

It is noted that when the free electron laser is operated as an oscillator, the operating wavelengths will tend to evolve toward the wavelength for maximum gain. This wavelength may not be consistent with the optical phase slip required for limitation of the amplitude of the betatron motion, in which case it is necessary to stabilize the frequency of the oscillator through the use of an intra-cavity dispersive element, a selective absorber, or through the use of injection locking.

In summary it can be seen that the present invention provides a mechanism for limiting the transverse excitation and thus permitting the maximum benefits of the gain-expanded configuration to be enjoyed. In view of the fact that the methods of limiting the growth of the transverse betatron motion within the laser interaction region have the effect of reducing the small signal gain, additional techniques have been disclosed for then optimizing the small signal gain.

While the above provides a full and complete disclosure of the preferred embodiments of the present invention, various modifications, alternate constructions and equivalents may be employed without departing from the true spirit and scope of the invention. For example, while a storage ring embodiment wherein an electron beam makes multiple passes through a single laser section is shown, the present invention is also applicable to a configuration where the beam makes one or more passes through a plurality of serially disposed laser sections. Moreover, while typical systems are operated at the fundamental optical wavelength (N=1), operation at the odd order harmonics is possible without loss of performance. Therefore, the above description and illustration should not be construed as limiting the scope of the invention which is defined by the appended claims.

I claim:

1. In a gain-expanded free electron laser including
means for providing an evacuated channel having a longitudinal axis,
means for injecting a relativistic electron beam characterized by a design energy $\gamma_0 mc^2$ into said channel in a direction generally parallel to the axis of said channel,
means for supporting an electromagnetic wave in at least a region of said channel, which electromagnetic wave is characterized by an optical axis generally parallel to the axis of said channel, and by an optical phase,
means for dispersing the electrons in transverse position at the entrance to said channel in proportion to said electrons' deviations in energy from said design energy,
magnet means for generating a magnetic field perpendicular to the axis of said channel, said magnetic field having
a periodic component $B_0$ which reverses periodically along said axis, though remaining constant in time, said periodic component being used to impart a periodic transverse motion and velocity to said electrons in said electron beam,
said periodic component being characterized by a transverse gradient k perpendicular to said magnetic field and the axis of said channel wherein said gradient and said dispersing means are used to selectively increase the transverse velocity of high energy electrons moving through said magnet means thereby maintaining constant longitudinal velocity for all electrons independent of initial energy, said transverse gradient k in said periodic field deflecting said electrons towards a direction of lower magnetic field, and a non-reversing component $B_c$ with transverse gradient s, said non-reversing component opposing the deflection of said electron beam by said periodic component, said gradient s preserving the dispersion in energy and transverse position established at the start of said magnet means, said evacuated channel, said supporting means, and said magnet means defining an interaction region of length L in which said electromagnetic wave exchanges energy with said electron beam, said magnet means, said electromagnetic wave, and said electron beam being characterized by a net optical phase slip qL during the interaction between the phase of said electromagnetic wave and the phase of said electron transverse velocity, and a spatial frequency $\tilde{\Lambda}$ for free betatron oscillations about the electrons' nominal trajectories, thereby defining a net betatron phase advance $\tilde{\Lambda}L$, the improvement wherein said net optical phase slip qL and said betatron phase advance $\Lambda$ satisfy the following conditions:

$$|qL| = K\pi$$

$$|qL - \tilde{\Lambda}L| = M2\pi$$

where K is an integer and M is any positive integer, whereupon the excitation of the betatron motion excited during the passage of said electrons through said interaction region is suppressed.

2. In a gain-expanded free electron laser including means for providing an evacuated channel having a longitudinal axis, means for injecting a relativistic electron beam characterized by a design energy $\gamma_0 mc^2$ into said channel in a direction generally parallel to the axis of said channel, means for supporting an electromagnetic wave in at least a region of said channel, which electromagnetic wave is characterized by an optical axis generally parallel to the axis of said channel, and by an optical phase, means for dispersing the electrons in transverse position at the entrance to said channel in proportion to said electrons' deviations in energy from said design energy, a plurality of magnets having tapered pole faces for generating a magnetic field perpendicular to the axis of said channel, said magnetic field having a periodic component $B_0$ which reverses periodically along said axis, though remaining constant in time, said periodic component being used to impart a periodic transverse motion and velocity to said electrons in said electron beam, said periodic component being characterized by a spatial gradient k perpendicular to said magnetic field and the axis of said channel wherein said gradient and said dispersing means are used to selectively increase the transverse velocity of high energy electrons moving through said magnet means thereby maintaining constant longitudinal velocity for all electrons independent of initial energy, said transverse gradient in said periodic field deflecting said electrons towards a direction of lower magnetic field, and a non-reversing component $B_c$ with transverse gradient s, said non-reversing component opposing the deflection of said electron beam by said periodic component, said gradient s preserving the dispersion in energy and transverse position established at the start of said magnet means, said evacuated channel, said supporting means, and said magnets defining an interaction region in which said electromagnetic wave exchanges energy with said electron beam, the improvement wherein at least one of said magnets comprises:

first and second adjacent magnet segments, each magnet segment comprising first and second pole pieces with associated windings;

the pole pieces in said first magnet segment having facing pole faces inclined relative to one another to define a first angle of taper;

the pole pieces in said second magnet segment having facing pole faces inclined relative to one another to define a second angle of taper differing from said first angle of taper;

said first magnet segment, when energized alone, providing a first magnetic field characterized by a first value of field gradient perpendicular to said first magnetic field;

said second magnet segment, when energized alone, providing a second magnetic field characterized by a second value of field gradient perpendicular to said first magnetic field;

whereupon the field gradient produced by said magnet may be made to assume a desired value between said first value and said second value by choosing the relative excitation of the associated windings of said first magnet segment relative to the excitation of the associated windings of said second magnet segment;

whereupon said gain-expanded free electron laser is rendered capable of operation over a range of wavelength.

3. The invention of claim 1 or 2 wherein said electromagnetic wave is an odd-order harmonic of the fundamental wavelength defined by the period of said periodic component and the mean longitudinal velocity of said electron beam.

4. The invention of claim 1 or 2 wherein said electromagnetic wave has the fundamental wavelength defined by the period of said periodic component and the mean longitudinal velocity of said electron beam.

5. The invention of claim 1 or 2, and further comprising:

means for extracting said electron beam from said interaction region;

means for accelerating the electrons in said electron beam to restore the energy lost in said interaction region; and means for transporting said beam to said means for injecting for reinjection into said channel;

whereupon said free electron laser operates as a storage ring free electron laser.

6. In a gain-expanded, free electron laser including means for providing an evacuated channel having a longitudinal axis, means for injecting a relativistic electron beam characterized by a design energy $\gamma_0 mc^2$ into said channel in a direction generally parallel to the axis of said channel, means for supporting an electromagnetic wave in at least a region of said channel, which electromagnetic wave is characterized by an optical axis generally parallel to the axis of said channel, and by an optical phase, means for dispersing the electrons in transverse position at the entrance to said channel in proportion to said electrons' deviations in energy from said design energy, magnet means for generating a magnetic field perpendicular to the axis of said channel to impart a periodic transverse motion and velocity to said electrons, said evacuated channel, said supporting means, and said magnet means defining an interaction region in which said electromagnetic wave exchanges energy with said electron beam, the improvement wherein said magent means comprises:

means for generating a first periodic component $B_0$ which reverses periodically along said axis, though remaining constant in time, at a fundamental period;

means for generating a second interspersed periodic component $B_n$ which reverses periodically along said axis at a supplementary period that is an even multiple or sub-multiple of said fundamental period of said first periodic component;

said first and second periodic components each being characterized by a transverse gradient k perpendicular to said magnetic field and the axis of said channel wherein said gradient k and said dispersing means are used to selectively increase the transverse velocity of high energy electrons moving through said magnet means, thereby maintaining constant longitudinal velocity for all electrons independent of initial electron energy, said gradient k deflecting said electrons towards a direction of lower magnetic field; and means for generating a non-reversing component $B_c$ with transverse gradient s, said non-reversing component opposing the deflection of said electron beam by said gradient k, said gradient s preserving the dispersion in energy and transverse position established at the start of said magnet means;

the respective amplitudes and periods of said first and second periodic components together with said design energy $\gamma_0 mc^2$ defining a mean longitudinal velocity $v_{par}$ of said electron beam and an operating wavelength of said free electron laser, whereby the presence of said second periodic component provides increased flexibility in the configuration of said magnet means for particular values of said operating wavelength and design energy.

7. The invention of claim 2 or 6 wherein:

said interaction region is of length L;

said magnet means, said electromagnetic wave, and said electron beam are characterized by a net optical phase slip qL during the interaction between the phase of said electromagnetic wave and the phase of said electron transverse velocity, and are further characterized by a spatial frequency $\bar{\Lambda}$ for free betatron oscillations about the electrons' nominal trajectories, thereby defining a net betatron phase advance $\bar{\Lambda}L$; and said net optical phase slip qL and said betatron phase advance satisfy the following conditions $|qL| = K\pi$ $|qL - \bar{\Lambda}L| = M2\pi$ where K is an integer and M is any positive integer;

whereupon the excitation of the betatron motion excited during the passage of said electrons through said interaction region is suppressed.

8. The invention of claim 6 wherein the respective amplitudes and periods of said first and second periodic components are related to one another so as to provide a value of mean longitudinal velocity that is substantially constant over the length of said interaction region.

9. In a free electron laser including means for providing an evacuated channel having a longitudinal axis, means for injecting a relativistic electron beam characterized by a design energy $\gamma_0 mc^2$ into said channel in a direction generally parallel to the axis of said channel, means for supporting an electromagnetic wave in at least a region of said channel, which electromagnetic wave is characterized by an optical axis generally parallel to the axis of said channel, and by an optical phase, magnet means for generating a magnetic field perpendicular to the axis of said channel to impart a periodic transverse motion and velocity to said electrons, said evacuated channel, said supporting means, and said magnet means defining an interaction region in which said electromagnetic wave exchanges energy with said electron beam, said electron beam and said magnet means being characterized by a mean longitudinal velocity $v_{par}$, the improvement wherein said magnet means comprises:

means for generating a first periodic component $B_0$ which reverses periodically along said axis, though remaining constant in time, at a fundamental period; and means for generating a second interspersed periodic component $B_n$ which reverses periodically along said axis at a supplementary period that is an even multiple or sub-multiple of said fundamental period of said first periodic component;

the respective amplitudes and periods of said first and second periodic components together with said design energy $\gamma_0 mc^2$ defining a mean longitudinal velocity $v_{par}$ of said electron beam and an operating wavelength of said free electron laser, whereby the presence of said second periodic component provides increased flexibility in the configuration of said magnet means for particular values of said operating wavelength and design energy.

10. The invention of claim 9, and further comprising:

means for dispersing the electrons in transverse position at the entrance to said channel in proportion to said electrons' deviations in energy from said design energy; and means associated with each of said first and second magnet sections for generating a transverse gradient perpendicular to said magnetic field and the axis of said channel wherein said gradient and said dispersing means are used to selectively increase the transverse velocity of high energy electrons moving through said magnet means, thereby maintaining constant longitudinal velocity for all electrons independent of initial electron energy.

11. The invention of claim 10 wherein the gradients associated with said first and second magnet sections are equal.

12. In a gain-expanded, free electron laser including
means for providing an evacuated channel having a longitudinal axis,
means for injecting a relativistic electron beam characterized by a design energy $\gamma_0 mc^2$ into said channel in a direction generally parallel to the axis of said channel,
means for supporting an electromagnetic wave in at least a region of said channel, which electromagnetic wave is characterized by an optical axis generally parallel to the axis of said channel, and by an optical phase,
means for dispersing the electrons in transverse position at the entrance to said channel in proportion to said electrons' deviations from said design energy;
magnet means for generating a magnetic field perpendicular to the axis of said channel to impart a periodic transverse motion and velocity to said electrons in said electron beam,
said evacuated channel, said supporting means, and said magnet means defining an interaction region in which said electromagnetic wave exchanges energy with said electron beam,
the improvement wherein said magnet means comprises:
first and second serially disposed magnet sections, each of which includes
means for generating a periodic component which reverses periodically along said axis, though remaining constant in time, said periodic component being characterized by a spatial gradient perpendicular to said magnetic field and the axis of said channel wherein said gradient of said periodic component and said dispersing means are used to selectively increase the transverse velocity of high energy electrons moving through said magnet means thereby maintaining constant longitudinal velocity for all electrons independent of initial electron energy, said gradient of said periodic component deflecting said electrons towards a direction of lower magnetic field, and
means for generating a non-reversing component having a transverse gradient, said non-reversing component opposing the deflection of said electron beam by said periodic component, said gradient of said non-reversing component preserving the dispersion in energy and transverse position established at the start of said magnet means; and
means defining a matching section serially disposed between said first and second magnet sections;
said first magnet section, said electromagnetic wave, and said electron beam being characterized by a first optical phase slip per unit length q and a first betatron phase advance per unit length $\bar{\Lambda}$;
said second magnet section, said electromagnetic wave and said electron beam being characterized by a second optical phase slip per unit length q* and a second betatron phase advance per unit length $\bar{\Lambda}^*$, different from said first optical phase slip per unit length and said first betatron phase advance per unit length;
said matching section, said electromagnetic wave, and said electron beam being characterized by a total optical phase slip that is an integral multiple of $2\pi$ radians, being further characterized by a betatron phase advance per unit length that varies between the value of $\bar{\Lambda}$ adjacent said first magnet section and the value of $\bar{\Lambda}^*$ adjacent said second magnet section with the total betatron phase advance over the length of said matching section being an integral multiple of $2\pi$ radians;
said matching section operating to change the spatial component of the betatron amplitude in proportion to the square root of the ratio of $\bar{\Lambda}/\bar{\Lambda}^*$ between the point at which said electron beam leaves said first magnet section and the point at which said electron beam enters said second magnet section.

13. In a gain-expanded, free electron laser including
means for providing an evacuated channel having a longitudinal axis,
means for injecting a relativistic electron beam characterized by a design energy $\gamma_0 mc^2$ into said channel in a direction generally parallel to the axis of said channel,
means for supporting an electromagnetic wave in at least a region of said channel, which electromagnetic wave is characterized by an optical axis generally parallel to the axis of said channel, and by an optical phase,
means for dispersing the electrons in transverse position at the entrance to said channel in proportion to said electrons' deviations from said design energy;
magnet means for generating a magnetic field perpendicular to the axis of said channel to impart a periodic transverse motion and velocity to said electrons in said electron beam,
said evacuated channel, said supporting means, and said magnet means defining an interaction region in which said electromagnetic wave exchanges energy with said electron beam;
the improvement wherein said magnet means comprises:
first and second serially disposed magnet sections and a matching section interposed therebetween, each of which includes
means for generating a periodic component which reverses periodically along said axis, though remaining constant in time, said periodic component being characterized by a spatial gradient perpendicular to said magnetic field and the axis of said channel wherein said gradient of said periodic component and said dispersing means are used to selectively increase the transverse velocity of high energy electrons moving through said magnet means thereby maintaining constant longitudinal velocity for all electrons independent of initial electron energy, said gradient of said periodic component deflecting said electrons towards a direction of lower magnetic field, and
means for generating a non-reversing component having a transverse gradient, said non-reversing component opposing the deflection of said electron beam by said periodic component, said gradient of said non-reversing component preserving the dispersion in energy and transverse position established at the start of said magnet means;

said first magnet section, said electromagnetic wave, and said electron beam being characterized by a first optical phase slip per unit length q and a first betatron phase advance per unit length $\tilde{\Lambda}$;

said second magnet section, said electromagnetic wave and said electron beam being being characterized by a second optical phase slip per unit length q* and a second betatron phase advance per unit length $\tilde{\Lambda}^*$, different from said first optical phase slip per unit length and said first betatron phase advance per unit length;

said matching section, said electromagnetic wave, and said electron beam being characterized by a total optical phase slip that is an integral multiple of $2\pi$ radians, being further characterized by a betatron phase advance per unit length that varies between the value of $\tilde{\Lambda}$ adjacent said first magnet section and the value of $\tilde{\Lambda}^*$ adjacent said second magnet section with the total betatron phase advance over the length of said matching section being an integral multiple of $2\pi$ radians;

said matching section operating to change the spatial component of the betatron amplitude in proportion to the square root of the ratio of $\tilde{\Lambda}/\tilde{\Lambda}^*$ between the point at which said electron beam leaves said first magnet section and the point at which said electron beam enters said second magnet section.

14. The invention of claim 12 or 13 in which the net optical phase slip during the interaction between the phase of said electromagnetic wave and the phase of said electron transverse velocity is an integral multiple of $\pi$ radians and differs from the net betatron phase advance by a non-zero integral multiple of $2\pi$ radians, whereupon the excitation of the betatron motion excited during the passage of the electrons in said electron beam through said interaction region is suppressed.

* * * * *